Oct. 25, 1949.  B. M. KING, JR  2,485,742
PROCESS FOR MOLDING CELLULAR PRODUCTS
Filed March 3, 1948
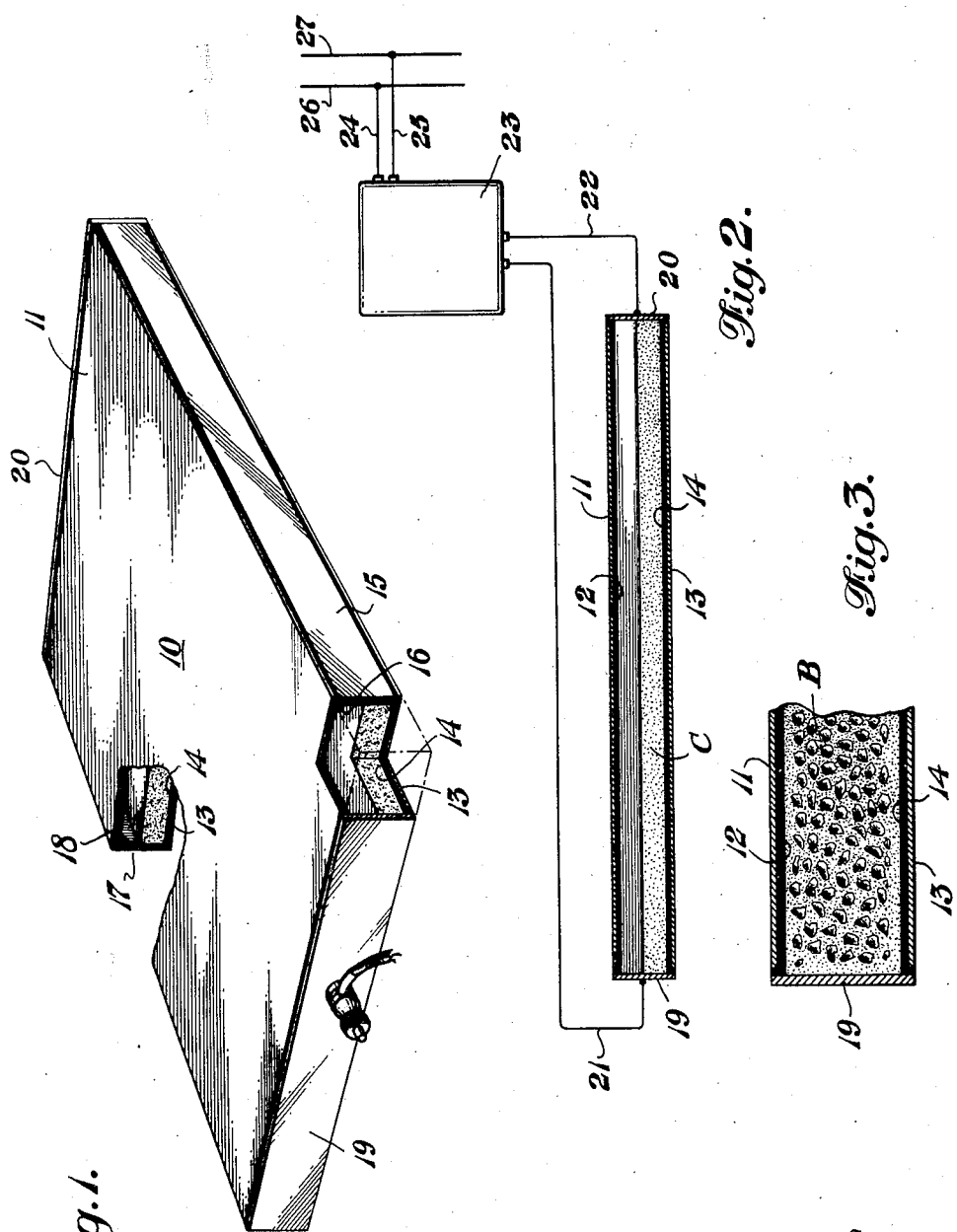
Inventor
Benjamin M. King, Jr.
By Flocks and Simon
Attorneys Patented Oct. 25, 1949

2,485,742

UNITED STATES PATENT OFFICE 2,485,742

PROCESS FOR MOLDING CELLULAR PRODUCTS

Benjamin M. King, Jr., Evansville, Ind.

Application March 3, 1948, Serial No. 12,820

6 Claims. (Cl. 25—155)

1

The present invention relates to a process for the production of cellular products. More particularly the present invention relates to a process for the production of relatively light-weight cellular products especially suitable for building material use and formed by the generation of gas within a plastic mass including a hydraulic cement binder and a gas evolving agent.

Various methods for the production of lightweight building materials of this character have previously been proposed. In general this has included methods which involve in situ formation of gas by chemical reaction and other methods which involve the production of foam and the subsequent pouring of the foam into forms or molds. The present invention is primarily concerned with the first of these aforementioned methods.

In general in producing gas in situ within a plastic mass for the present purpose various chemical combinations have been proposed, among them the addition of suitable metals capable of reacting with the alkaline constituents of the cement to form a gas as, for example, hydrogen. In the alternative it has also been proposed to utilize combinations including components capable of reacting to form other gases such as carbon dioxide. For the formation of hydrogen, it has been proposed to use such metals as powdered aluminum, powdered metallic calcium, powdered metallic barium, carbides of calcium or barium, and alloys of various metals such as zinc and copper, zinc and iron or various other combinations. For the production of gases other than hydrogen, various chemicals have been used such as combinations of limestone (calcium carbonate), ammonia and hypochlorites. Chemical agents such as these produce quantities of chlorine, oxygen, hydrogen and carbon dioxide. In every case, however, the mixture employed included some chemical composition which promotes or starts the gas forming reactions by heating the composition. For example, hydrogen peroxide has been added to the compositions including limestone, ammonia and hypochlorite for this purpose and lime or caustic soda has been added to the compositions including a metal as the gas forming agent. The addition of these chemical heating agents which initiated the gas forming reaction by their exothermic action has not proven particularly satisfactory since the heating thus provided was not uniform in character and relatively large quantities of gas forming agents had to be used in order to provide sufficient gas. In addition, non-uniform porous materials were often thus produced.

In accordance with the present invention there has been provided a novel process for the production of porous masses from hydraulic cement binders and gas evolving agents which includes

2 the heating of a plastic mixture of the aforesaid components by means of a high frequency electrostatic field.

A second general object of the present invention is to provide a novel method for the more uniform production of highly porous cellular building materials.

Other objects and the nature and advantages of the instant invention will be apparent from the following description taken in conjunction with the accompanying drawings, wherein:

Figure 1 is a diagrammatic perspective view of a mold used in the production of cellular masses according to the present invention.

Figure 2 is a diagrammatic illustration of the mold in section showing a simplified electrical circuit connected thereto.

Figure 3 is an enlarged section of a portion of the mold with the finished plastic mass depicted therein.

The process according to the present invention includes pouring a plastic mass of the character described which may include in addition to hydraulic cement, water, various fillers, aggregates and improving agents such as clays, silts and other agents known in the art, into a mold, and thereafter applying to the mold a high frequency electrostatic field for a relatively short period to raise the temperature of the plastic mass and initiate the gas forming reaction. The high frequency field should not be applied for too long a period since if this is done, the heating effect will dehydrate the mass in a short time and instead of promoting the reaction to produce a porous mass, the reaction will be halted. In general the high frequency field is generated by a current of the order of 4000 volts and should have a frequency of from 1 to 100 megacycles. As is well known in connection with this type of heating, the higher the frequency, the greater the heating effect. In general an output or heating effect on the order of 1000 watts applied for a period of time of the order of one minute will be sufficient to initiate this reaction. Thereafter the mass is allowed to rise until it rises to the desired extent and a further application of a high frequency electrostatic field for a short period will cause the material to set. If it is then desired to cure the material, several applications may be made of the same type of heating as hereinbefore described alternated with periods wherein the material is sprinkled with water. This thoroughly cures the mass in a relatively short period of time.

Referring to the figures of the drawing and particularly Figure 1, a mold suitable for receiving a plastic mass according to the present invention is indicated in general at 10. The mold includes a top plate or cover or metal 11 insulated from the remainder of the mold by a layer of hard rubber or other suitable insulating material 12. The mold 10 also includes a bottom 13 of metal similarly insulated by a plate 14. Sides 15 and 17 are also provided, suitably insulated by the insulating layers coextensive with the sides and indicated at 16 and 18. The two ends 19 and 20 of the mold structure function as electrodes and are formed of a suitable conductive material. The electrodes or ends 19 and 20 are connected respectively to the leads 21, 22 which are connected to a high frequency generator or oscillator indicated at 23. The oscillator 23 is supplied with current by the wires 24 and 25 from a suitable source such as the line wires 26 and 27.

As shown in Figure 2, before starting the production of the porous mass a mixture of cement, together with a gas forming agent and/or other components, is poured into the mold to form a plastic mass indicated at C. The high frequency current is then turned on and the dielectric loss within the mass heats the same uniformly to a temperature sufficient to start the production of gas. Thereafter the mass is allowed to stand with the heat turned off until the mass fills the mold and forms a porous block, indicated at B in Figure 3. The following specific example serves to illustrate but is not intended to limit the present invention.

A mix of one sack of Portland cement (94 pounds), seven gallons of water and two ounces of aluminum powder was poured into a mold as hereinbefore described and subjected to a high frequency electrostatic field of 10 megacycles at 1000 watts for a period of one minute. At this time the temperature of the mass rose to approximately 180° F. and the chemical reaction resulting in the formation of gas was initiated. The heating was discontinued and the mass rose to the top plate of the mold in approximately eight minutes. Thereafter a further application of high frequency current of the same character was made for 30 seconds which caused an initial set at the maximum rise. After a 10 minute interval, another 30 second application of high frequency current was made which further secured the set. The mass was then cured by repeated applications of high frequency current of the character just described of two or three minutes' duration, alternating with periods of water sprinkling until the mass was thoroughly cured.

It will be obvious to those skilled in the art that various changes may be made without departing from the spirit of the invention and therefore the invention is not limited to what is shown in the drawings and described in the specification but only as indicated in the appended claims.

What is claimed is:

1. In a process for the production of cellular products formed from a mixture of a hydraulic cement binder and a gas evolving agent including a component capable of chemical reaction to form gas upon heating, the steps which comprise pouring said mixture into a mold, and applying to said mixture in said mold a high frequency electrostatic field for a period only sufficient to uniformly heat said mixture to initiate the production of gas.

2. In a process for the production of cellular products formed from a mixture of a hydraulic cement binder and a gas evolving agent including a component capable of chemical reaction to form gas upon heating, the steps which comprise pouring said mixture into a mold in a quantity sufficient to only partially fill the same, applying to said mixture in said mold a high frequency electrostatic field for a period only sufficient to uniformly heat said mixture to initiate the production of gas, allowing said mixture to rise and sufficiently fill said mold, and thereafter applying said high frequency electrostatic field to produce an initial set within said mass.

3. In a process for the production of cellular products formed from a mixture of a hydraulic cement binder and a gas evolving agent including a component capable of chemical reaction to form gas upon heating, the steps which comprise pouring said mixture into a mold in a quantity sufficient to only partially fill the same, applying to said mixture in said mold a high frequency electrostatic field for a period only sufficient to uniformly heat said mixture to initiate the production of gas, allowing said mixture to rise and sufficiently fill said mold, thereafter applying said high frequency electrostatic field to produce an initial set within said mass, and again applying said high frequency electrostatic field while setting said mass to promote the curing thereof.

4. In a process for the production of cellular products from a mixture of a hydraulic cement binder and a finely divided metal gas evolving agent capable of chemical reaction with the hydraulic cement to form gas upon heating, the steps which comprise pouring said mixture into a mold and applying to said mixture in said mold a high frequency electrostatic field for a period only sufficient to uniformly heat said mixture and produce a gas forming reaction between said finely divided metal and said cement.

5. In a process for the production of cellular products from a mixture of a hydraulic cement binder and finely divided aluminum gas evolving agent capable of chemical reaction with the hydraulic cement to form gas upon heating, the steps which comprise pouring said mixture into a mold and applying to said mixture in said mold a high frequency electrostatic field for a period only sufficient to uniformly heat said mixture and produce a gas forming reaction between said finely divided aluminum and said cement.

6. In a process for the production of cellular products formed from a mixture of hydraulic cement binder and a gas evolving agent including a component capable of chemical reaction to form gas upon heating, the steps which comprise pouring said mixture into a mold and applying to said mixture in said mold an electrostatic field generated by a high voltage electrical current having a frequency of from 1 to 100 megacycles for a period only sufficient to uniformly heat said mixture to initiate the production of heat.

BENJAMIN M. KING, JR.

REFERENCES CITED

The following references are of record in the file of this patent:

UNITED STATES PATENTS

| Number | Name | Date |
| --- | --- | --- |
| 1,808,762 | Brund et al. | June 9, 1931 |

FOREIGN PATENTS

| Number | Country | Date |
| --- | --- | --- |
| 517,798 | Great Britain | Feb. 8, 1940 |